United States Patent [19]

Pischke et al.

[11] 3,962,468

[45] June 8, 1976

[54] SPRAY-DRIED L-ASPARTIC ACID DERIVATIVES

[75] Inventors: LaMonte D. Pischke; Myron D. Shoaf, both of Danbury, Conn.

[73] Assignee: General Foods Corporation, White Plains, N.Y.

[22] Filed: Mar. 7, 1974

[21] Appl. No.: 448,845

[52] U.S. Cl. .............................. 426/96; 426/103; 426/548
[51] Int. Cl.² ........................................ A23L 1/236
[58] Field of Search ............. 426/89, 96, 212, 217, 426/215, 380, 471, 364, 103, 548

[56] References Cited
UNITED STATES PATENTS

| | | |
|---|---|---|
| 3,753,739 | 8/1973 | Cella et al............................ 426/217 X |
| 3,761,288 | 9/1973 | Glicksman et al. ................. 426/380 |

*Primary Examiner*—A. Louis Monacell
*Assistant Examiner*—Esther L. Massung
*Attorney, Agent, or Firm*—Bruno P. Struzzi; Thomas V. Sullivan; Michael J. Quillinan

[57] ABSTRACT

A slurry-forming substantial level of discretely-sized hydrated L-aspartic acid sweetening compound, preferably one milled to reduce the particle size of undissolved ester crystals, is encapsulated in a dextrinous water soluble agent by drying a uniform dispersion as by spray drying to yield a high density readily soluble powderous sweetening composition which is readily blendable and uniform in sweetening power and resists caking.

18 Claims, No Drawings

SPRAY-DRIED L-ASPARTIC ACID DERIVATIVES

RELATED INVENTIONS

This invention is related to but distinct from U.S. Pat. No. 3,761,288 issued Sept. 25, 1973 to Glicksman et al for Method For Making a Low Calorie Sweetening Composition and employs L-aspartic acid compounds of the type set forth in U.S. Pat. Nos. 3,492,131; 3,475,403; and 3,769,333.

BACKGROUND OF THE INVENTION

This invention relates to new and useful L-aspartic acid derivatives and non-toxic, pharmaceutically acceptable salts thereof and more particularly is concerned with compositions wherein such derivatives are fixed in a stable, dry form useable in comestibles such as dry beverage mixes.

Synthetic sweetening agents have become quite useful in their ability to lower sugar intake and provide diets of satisfactory taste but lowered caloric value. One of the more consequential and promising sweeteners is the class of L-aspartic acid derived esters which have emerged in attempts to find new artificial sweeteners other than the more common saccharine or cyclamates which have previously been used.

The use of such recent sweeteners in comestibles and particularly in dry mixes such as in beverage mixes presents a significant opportunity to provide sweetness equivalent to sucrose. However, it is important that the esters be stabilized in a form whereby they do not undergo degradation with accompanying loss of sweetness and are unavailable for reaction with aldehydes or ketones or other agents which can alter intended organoleptic response when the ultimate sweetened composition is consumed. Many of these L-aspartic acid derivatives such as L-aspartyl-L-phenylalanine methyl ester (APM) are prone to undergo a loss of sweetness in the presence of moisture rendering such derivatives virtually non-functional in many food applications. Moreover, in attempts to stabilize the ester in a dry fixation, it is important that it be uniformly distributed to provide sweetness uniformity; this is quite important in view of the manifold sweetening power of such esters. A further requisite is that any fixed ester be stable against caking; many such esters are per se prone to cluster and even when fixed in certain matrices will promote such caking as occasion the need for expensive packaging barriers; even under the most extreme moisture protection common fixation of esters such as APM experience caking due to the character of the ester.

It is desirable, therefore, to so compose the L-aspartic acid derivatives in a form whereby they do not suffer the foregoing sensitivities to storage conditions. Preferably such a composition should have a reasonably controlled equilibrium relative humidity, that is, a low equilibrium relative humidity wherein it does not significantly absorb moisture to an extent whereby the derivative undergoes decomposition or reaction. The high order of sweetness necessitates use of the compounds in controlled amounts as a minor weight constituent of the total powderous mixture of which they form a part, typically less than 15%. In order to facilitate handling of the sweetening compositions of which the ester is a part, it becomes desirable to have the derivative compound fixed in a suitable solid carrier at a very high weight percent, generally in excess of 20% of the carrier or fixative. It is desirable to minimize the amount of fixative for the sweetening derivative since it is otherwise nonfunctional, adds bulk and cost, and indeed detracts significantly from the ability to market comestibles with claims for substantial reduction of calories. It also becomes quite desirable to have the carrier associated with the L-aspartic acid derivative by a process which does not significantly reduce the density of the sweetening ester-containing composition particles; this reduces any segregation difficulty encountered by reason of too wide a disparity with food acid or like particles having a high bulk density, say, of about 0.8 grams per cc. The absolute density of one of these L-aspartic acid derivatives (APM) is in an order of 1.038 grams per cc but the bulk density of its characteristic needle-like crystalline structure is about 0.2 grams per cc; thus, it becomes desirable to achieve a density in the compositon containing the derivative as high as practicable and in any event not less than 0.2 grams per cc to provide flow and handling properties facilitating uniformity in mixing and packaging of the synthetic sweetening agent in powderous beverage and like mixes for other comestibles having significant amounts of higher density particles. Concomitantly, in effecting this density criteria, it is important that the carrier provide the foregoing protection against other packaging conditions which are set forth hereinabove, i.e., the effects of moisture as by providing a relatively low-hygroscopic state. Furthermore, it becomes desirable to achieve both objectives of bulk density increase and a lowering of the equilibrium relative humidity uniformly in a compatible composition that can be economically processed without a significant loss of the L-aspartic acid ester derivative as by premature or uncontrolled crystallization and interference or interruption of the fixation operation, as by spray drying.

STATEMENT OF THE INVENTION

It has now been found that the foregoing requisites can be provided while affording an artificial sweetener which has a practical and useful high rate of solution by co-drying in a dextrin solution a high (e.g. 40–70% of total solids) slurry-producing level of discretely distributed, small-sized, undissolved hydrated particles of L-aspartic acid derivative sweetening compounds to be hereinafter classified, the level of said undissolved sweetening compound solids being a major amount of the total level of said sweetening solids in said dispersion. In accordance with its broadest parameters, the invention contemplates that a wide class of L-aspartic acid derivatives and typically dipeptide sweeteners like APM can be advantageously dried while being discretely dispersed and in an aqueous solution of a corn syrup dextrin or like low-molecular weight starch hydrolysis product. The preferred drying procedure that is employed in acccordance with this invention will involve the conversion of this slurry into discrete droplets which are then dried as in a spray drying tower.

The dextrin material used in accordance with this invention should dissolve easily in water and preferably produce a clear solution and should be relatively non-hygroscopic. In this regard the dextrin material should have a sufficiently low molecular weight to be easily soluble in water and yet be high enough so that hygroscopicity is avoided in large measure; a dextrin material which results in a dextrose equivalency in solution in the order of 1–40 will be operable but preferably should be below 20, a typical useful dextrin will be in the range of 5–15 D.E. It is believed that best results will be obtained if the dextrine material contains little or no mono-saccharides, i.e., glucose, and contains a predominant (major) distribution of oligosaccharides, i.e., saccharides having 1–8 saccharide units, with a significant presence of hexamers and heptamers; a useful dextrin material will be an enzymatic corn syrup digestion or hydrolyzate typified by the product available from CPC International, Inc. under the name Mor-Rex.

The preferred L-aspartic acid derivative may be referred to herein as a dipeptide sweetener in those instances wherein compounds of the class set forth in the U.S. Pat. No. 3,492,131 to Schlatter et al issued Jan. 27, 1970 and U.S. Pat. No. 3,475,403 to Mazur et al issued Oct. 28, 1969 for Aspartic Acid-Containing Dipeptide Lower Alkyl Esters are employed; e.g. the methyl ester of L-aspartyl L-phenylalanine and like L-L dipeptides as well as isomers containing the L-L dipeptide, that is, DL-aspartyl-L-phenylalanine, L-aspartyl-DL-phenylalanine and DL-aspartyl-DL-phenylalanine. On the other hand, other nontoxic pharmaceutically acceptable L-aspartic acid derivatives may be similarly fixed such as the class dislcosed in U.S. Pat. No. 3,769,333 issued Oct. 30, 1973 to Lapidus et al for L-Aspartic Acid Derivatives, this latter class of compounds having a general formula wherein an aspartic acid unit is synthesized with an amino group and a substituted radical.

For the purposes of the present invention, therefore, subgeneric classes of L-aspartic acid derivatives may be employed, the first and preferred derivative having the general formula:

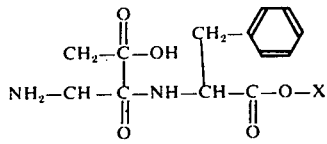

wherein X is preferably a methyl ester but less preferably may be a higher alkyl group such as ethyl, n-propyl, butyl, pentyl, hexyl, heptyl.

The second category of L-aspartic acid derivatives will have the general configuration:

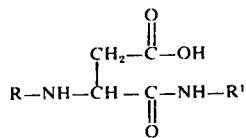

and wherein R and $R^1$ are the radicals of the same designation stated in Lapidus et al.

It should be appreciated from the foregoing, therefore, that the invention has applicability to the effective fixation in dry carriers of a broad class of L-aspartic acid derivatives which may be classed either as dipeptides or which may have other amino compounds substituted thereon together with a number of radicals coextensive with the requirements for sweetness. The present invention is not predicated upon any specific sweetener of L-aspartic acid derivation but rather is intended to be functional for the wide class of such compounds dried from a hydrated but undissolved slurry state.

Materials that may be used to form slurries of use in accordance with the present invention include the following sweetening derivative compounds:

1. The methyl esters of L-aspartyl-2,5-Dihydro-L-phenylalanine; L-aspartyl-L-(1-cyclohex-1-en)-alanine; L-aspartyl-L-phenylglycine; L-aspartyl; L-2,5-dihydro-phenylglycine;

2. As disclosed in French Pat. No. 2,877,486 issued Jan. 21, 1972 to R. H. Rhone-Poulene SA;

3. Lower alkyl esters of L-aspartyl-L, (Beta-cyclohexyl) alanine disclosed in Swiss Pat. No. 6,905,910 issued 4. Those alkyl esters classed as alpha-L or DL-aspartyl-L or DL-substituted glycine described in Netherlands Pat. No. 7,007,176 issued May 19, 1974 preparation of aspargyl compounds and issued to Stamicarbon, NV.;

5. Those hydrogenated dipeptide ester sweeteners such as L-asparagio-O-etherfied serine methyl esters described in French Pat. No. 2,105,896 issued Apr. 28, 1972 for Dipeptide Ester Sweeteners to Takeda Chemical Industries Ltd.;

6. Having the formula:
   $H_2CC(CH_2 COOH)HCONHC(R_1)(R_2)COOR$ where R and $R_1$ are $CH_3$ or $C_2H_5$ and $R_2$ is 4–7C alkyl having the stereo chemical form L-L,DL-L,L-DL, or DL-DL;

7. Those sweetening agents having the compound:

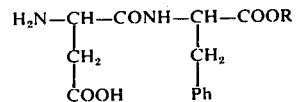

shown in British Pat. No. 1,339,101 issued Nov. 28, 1973 to Searle and Co., G.D. wherein R is a lower alkyl such as methyl and is prepared by reacting an N-protected -L-aspartic anhydride with L-phenylalanine lower alkyl esters, and 8. Those sweetening preparations having the formula L-aspartyl-L-1,4-dimethyl-pentyl amide disclosed in German Pat. No. 2,306,909 issued Aug. 23, 1973 to Procter and Gamble.

The class of L-aspartic acid derivatives which are sweet generally have a low solubility rate, e.g. APM, and, although the acid salts thereof such as the citric acid salt of APM are more soluble, the rates of solubility still leave much to be desired. The present invention takes advantage of the insolubility of these derivatives by suspending them as discrete dispersions in the dextrin solution at high concentrations, preferably by maintaining the slurry at low enough temperatures, generally below 160°F, to assure a continued slurry formation as contrasted with complete solubilization. However, in some applications it may be convenient and desirable to increase solubility as well as density somewhat by including in the fixing solids an edible food acid such as citric, phosphoric, tartaric or fumaric among the class of like organic as well as inorganic acids; in the practice of the invention, a discrete dispersion of ester particles should still remain to be effectively encapsulated upon dehydration; an appropriate rule will be that a major amount of undissolved sweetening compound solids will remain in suspension and be separable by vacuum filtration prior to dehydration;

acid level criteria will partly be a function of the sweetening ester concentration and to a large degree the intended sweetening composition density.

For some marketing requirements, it may be desirable to increase density up to, say, 0.50 grams per cc, and the use of acids such as citric acid as a minor weight percent of the dextrin solids or the sweetening ester solids will produce preferred results. Generally, the objects of the invention can be met by encapsulating the L-aspartic acid derivatives in a most dense readily soluble and readily flowable form through use of edible acids in the fixative solution as a major or a minor percent of the total fixing solids, but preferably as a minor percent of the encapsulating solids per se; say, 0–10% of the total solids in the composition.

In the broad context the invention strives to have an incomplete solution of the sweetening ester compound and so in some applications no substantial acidifying will be added.

In the most preferred embodiments a cool ambient dispersion of the compound in the dextrinous solution will be caused to undergo dehydration as by droplet formation in a drying atmosphere; generally the dispersion is maintained well below 160°F and preferably below 100°F.

The means for effecting dehydration of the aforesaid dispersion is not critical and means will occur to those skilled in the art whereby droplets can be effectively formed and the dispersed compounds effectively encapsulated with a satisfactorily recovered yield of dried powderous material. However, in practicing the preferred drying process, spray drying, certain precautionary procedures should be followed. The trajectory of the droplets should be such that they do not hit the sides of the drying tower while in the wet form so as to occasion plastering. An inlet air temperature below 475° is preferred in order to avoid browning of the material and occasion degradation of the heat sensitive and reactive L-aspartic acid compound; a preferred inlet air temperature will range between 350°–450°F, it being understood that drier inlet temperature conditions are a function of the relationship thereof to the quantity of heated air or other drying gas and the relative feed rates of the charge particles, their size and quantity, all of which factors are experimentally and routinely derived in producing beadlets of 1–5% moisture.

By practicing this invention densities of product may be recovered which range between 0.20 and 0.35 grams per cc, although still higher densities may be achieved with increased use of acids. The spray dried material that is recovered is essentially in the form of spherical particles some of which are hollow and some of which are relatively solid or beadlet in physical form.

The quantity of moisture to effect this dispersion and dextrin solution condition is not critical but preferably the total solids will be a minor weight percent of the feed solution to the drying tower. On the other hand, as one reduces the moisture content and correspondingly increases the solids content as by increasing the level of the compound to be dried (i.e., the L-aspartic acid derivative) it becomes more critical to assure effective dispersion of the compound. This is effected in slurries employing 15% or more L-aspartic acid derivative by weight of the total solids feed by assuring effective grinding or trituration thereof, that is passage of the dispersion through a narrow orifice having an opening no larger than 125 microns, so that the needle-like crystals are essentially finely divided in the presence of the dextrin solution. In this way, the dispersed L-aspartic acid compound, i.e., APM, is effectively and homogeneously distributed in the encapsulating solution. Thus, a typical feed stock will be a viscous solution which is converted to a smooth, non-granular, cream-like texture; a good test that the correct dispersion is produced is to separately add an equal quantity of water to an aliquot of the dispersion and observe the individual particles and their dispersed state; if the particles display the required uniform dispersion by such testing, they will instantly disperse and any large clustered particles will separate. A convenient though not essential procedure is to dissolve the dextrin in the aqueous medium used to disperse the triturated ester particles.

The invention will now be described by reference to the accompanying operative sample.

BEST MODE

A 25% solids slurry is prepared for processing through a Fryma mill, the stones of the mill being adjusted to a spacing of about 75 microns. A solution is prepared consisting of 60% APM solids and 40% corn syrup solids (malto dextrin), 10 D.E. The dispersion at 70°F enters the mill and issues at a temperature of approximately 85°F therefrom, the mill being jacketed with water maintained at 160°F. The finished relatively cool aerated slurry is collected in a stainless steel kettle at a density of 0.75 gms per cc and is pumped by a positive displacement pump and fed under 250 p.s.i.g. spray pressure through a 40/27 nozzle and produces droplets which when dried had a size of 50–300 microns. The droplets are contacted by inlet drying air approximately 330°F entering a 16 ft. diameter vertical drying tower, the air being fed at 14000 cubic feet per minute and the outlet air temperature being at 210°F.

The droplets dry as spherical beads collected at a moisture content generally less than 5% and typically 2–3%. The dry particles have the following particle size distribution:

| Particle Size (U.S. Standard Sieve) | Weight % |
|---|---|
| +50 | 2.57 |
| −50, +70 | 27.33 |
| −70, +120 | 45.25 |
| −120, +140 | 10.60 |
| −140, +200 | 11.38 |
| −200, +300 | 1.74 |
| 10 Pan | 1.13 |

The particles have a uniform particle size distribution, are free-flowing, white, and dissolve in 60 seconds in 45°F water when in the presence of a beverage acid such as citric acid at pH 3.5. The droplets had a loose bulk density of 0.246 grams per cc and packed density of 0.282 grams per ss with percent packing after tapping of 12.8%.

The particles can be readily blended to a flowable condition with beverage mix ingredients such as dry citric acid or equivalent acidulent powder, flavors and colors and will be stable against caking when packaged in a water vapor transmission packaging barrier such as a polyethylene coated foil having a water vapor transmission of about 0.04 gms per 100 sq. inches in 24 hours at 100°F (95% Rel. Humidity).

In summary, therefore, a high density fixation of sweetening ester that is flowable, stable and is in a highly soluble form is provided. The fixation of the aspartyl acid derivative sweetening agent in an essentially discontinuous, discrete but uniform dispersion in the dextrinous solute assures a uniformity of sweetness. By maintaining the slurry prior to drying in a hydrated but relatively cool state which minimizes the opportunity for solution of the sweeteing derivative, a slurry may be held preparatory to drying for periods of time which might otherwise invite undesired reactions between the sweetening derivative and the dextrin fixative.

In accordance with its most preferred aspects, the aspartyl acid derivative will be maintained in this discrete and uniform dispersion by milling it in an ambient or reduced temperature aqueous medium, the upper temperature limit of that medium not being critical except to the extent that the derivative enters solution. The preferred technique of wet-milling is intended to avoid the eccentricities which are occasioned when APM crystals that may be needle-like or otherwise large-sized and not readily uniformly dispersible require some degree of subdivision. Within its broader aspects the invention covers the aspartyl acid derivative per se absent the use of such milling or subdivision techniques under conditions which provide this uniform particle size and which generally range from 1 to 75 microns. It is important that the aspartyl acid derivative be provided in the aqueous medium in the absence of clusters as it is transferred in slurry form at a high concentration to the zone of dehydration and particle size reduction assures this condition.

Although the invention has been more particularly and fully described by reference herein to spray-drying conditions which ideally produce a spherical particle, the processing advantages accrue to other procedures for the stabilization of discrete moieties of APM and like aspartyl acid derivative sweeteners. Thus a slurry produced in accordance with the process may be dried on a vacuum or atmospheric drum dryer, in a tray dryer or in a through circulation gas (air) dryer. Such forms of fixation drying will generally call for subdivision subsequently and a sizing to suit blendability for providing a uniform ingredient sweetness in the mix.

The specification has disclosed preferred embodiments wherein the dextrose equivalency of the dextrin solute is below 20 D.E. It is within the ambit of the present invention that less preferred fixations of the sweetening derivative in higher dextrose equivalent solutes ranging as high as 40 D.E. may be practiced, the limiting aspects of this higher D.E. dextrin being the stickiness of the solution and/or the possibility of interaction between reducing compounds such as dextrose with the aspartyl acid derivative which is not desired.

It is an important processing advantage of this invention that by producing a cool slurry-distribution of the aspartyl acid sweetening compound one is able to produce extraordinarily high concentrations of the derivative by weight (i.e., above 30%) of the carrier of fixative solids without encountering equipment plugging or blockage of drying equipment such as spray-drying atomizing nozzles and assuring a continuous and uniform sweetness in the ultimately dried composition. The degree of concentration is not critical to this invention and its benefits will be obtained at undissolved ester concentrations below 15% by weight of the total solids, it being understood that concentrations ranging from 20 to as high as 60% are optimal and ideal by reason of the ability to afford a much higher ratio of sweetness to calories contributed by the carrier. Thus, not only does the present invention provide a composition that is dense, stable, soluble and flowable, but also one which for a given sweetness intensity has a very consequential reduction in calories that are contributed by the dextrin solution; advantageously, in accordance with its most preferred aspects, a beverage mix compositions having an extremely low caloric value stemming from an admixture of edible food acids, buffer salts and natural or artifical colors and flavors is combined with a fixative which contributes less than 0.5 calories per sweetness level equivalent to a comparable sweetness of sucrose.

The concentration of aspartic acid derivative will vary in large measure in accordance with the sweetness thereof; of course, the sweeter the derivative, the less of it is required; however, it is estimated a minimum dextrin content of 10% by weight of the derivative will be necessary to fix the slurried derivative this level being in part functional in accordance with the dextrose equivalency, the higher the D.E. of the dextrin source the higher the fixation capacity and the lower the amount required. The spray dried form of the preferred embodiments of this invention can be quite distinctive. When viewed under normal microscopy (700 diameters), many of the particles will evidence the existence of discrete randomly nested crystals of sweetening compound; many of the crystals will appear to be interlaced while being bound or enveloped by the relatively transparent dextrin matrix. Whereas some particles will evidence a slight occasional protrusion of needle-like particles from this matrix, the large majority, if not the entirety, thereof will appear to be effectively bound by the dextrin material. In some spray drying operations, the particles may not be spherical but thus may be angularly or oblately shaped depending upon the characteristics of the drying tower and drying conditions employed. Under natural light, the particles will have a glass, glossy appearance and will retain this appearance under a typical storage experiment wherein it is subjected to ambient room temperature conditions.

The particles will have an equilibrium relative humidity as indicated above which admirably suits them for packaging with other food solids including relatively anhydrous acids such as citric. The spray dried form of fixed sweetener will have an equilibrium relative humidity at room temperature (68°F) such that the particles do not pick up more than 9% moisture in cases where the composition is dried to about 3% moisture; at between 40 and 80% equilibrium relative humidities, the fixed product will pick up less moisture than the ground counterpart that is unfixed; this indicates less of a tendency to absorb moisture under normal packaging conditions; on the other hand, the relative difference in moisture pick-up will generally not be reduced by more than 2% moisture gain at any given equilibrium relative humidity. Of great importance, however, is the fact that the fixed APM particles and their equivalent produced in accordance with this invention will not cake when stored in a dry blend with edible food acids such as citric acid, whereas the subdivided sweetening compound is quite prone to caking when co-mixed therewith in a simple blend when packaged in a polyfoil pouch or equivalent packaging material having a water vapor transfer rate not exceeding aforesaid water vapor transmission rate.

What is claimed is:

1. Process for fixation of L-aspartic acid derivative sweetening compounds which comprises causing a slurry-forming level of undissolved hydrated particles of the sweetening compound to be dispersed in an aqueous dextrin solution to produce a dispersion, the level of said sweetening compound being at least 15% by weight of the solids in said dispersion, the level of said undissolved sweetening compound being a major amount of the total level of said sweetening compound in said dispersion and the dispersion being maintained at a temperature low enough to assure the existence of at least a part of the sweetening compound as discretely distributed undissolved particles, and drying the dispersion to a moisture content below 5% and a density greater than 0.2 grams per cc. to encapsulate the particles of said sweetening compound in said dextrin.

2. The process of claim 1 wherein the dispersion is sprayed as droplets and then dried.

3. The process of claim 1 wherein the sweetening compound is milled while in an aqueous medium to effect said dispersion.

4. The process of claim 3 wherein the sweetening compound is admixed with the dextrin solution and then milled.

5. The process of claim 1 wherein the dextrin material has a solution D.E. less than 20.

6. The process of claim 5 wherein the dextrin has a dextrose equivalency of 5–15 and wherein the dextrin material contains a major amount of oligosaccharides.

7. The process of claim 1 wherein the sweetening compound is a lower alkyl ester of L-aspartyl-L-phenylalanine.

8. The process of claim 7 wherein the dispersion is maintained below 160°F.

9. The process of claim 1 wherein the dispersion is acidified.

10. The process of claim 9 wherein the acid is less than 10% of the composition.

11. The process of claim 1 wherein the dispersion is maintained below 100°F.

12. The process of claim 1 wherein the sweetening compound is present at a level of 40–70% of the total solids in the dispersion.

13. The process of claim 1 wherein the dispersion is cooled to less than 160°F and is spray dried at an inlet air temperature below 475°F.

14. The process of claim 13 wherein the sweetening compound is at least 15% of the total solids in the dispersion and the compound particles are milled in said dispersion by passage through a narrow orifice having an opening no larger than 125 microns.

15. A free-flowing, powderous, stable water-soluble, fixed sweetening composition produced by the process of claim 1 that is readily blendable, uniform in sweetening power and resists caking comprising L-aspartic acid sweetening compound particles and an encapsulating dextrin matrix, said composition having a major amount of said compound in the form of discrete randomly nested and interlaced crystals of said compound bound by the dextrin matrix, said composition having a density exceeding 0.20 grams per cc., the compound particles
ranging in size from 1 to 75 microns, the dextrin having a dextrose equivalency less than 20, said composition having a moisture content less than 5% and an equilibrium relative humidity at room temperature such that the particles thereof do not pick up more than 9% moisture when the composition is dried to about 3% moisture and such that at between 40% and 80% equilibrium relative humidities the composition will pick up less water than the ground counterpart thereof.

16. The composition of claim 15 wherein the sweetener compound is a lower alkyl ester of L-aspartyl-L-phenylalanine.

17. A spray dried form of the composition of claim 16.

18. The composition of claim 17 wherein the compound is a methyl ester.

* * * * *